INVENTOR
HEINZ HÄBERLE
BY Alfred C. Hill
AGENT

INVENTOR
HEINZ HÄBERLE

BY Alfred C. Hill

AGENT

INVENTOR
HEINZ HÄBERLE

BY Alfred C. Hill
AGENT

United States Patent Office 3,453,551
Patented July 1, 1969

3,453,551
PULSE SEQUENCE DETECTOR EMPLOYING A SHIFT REGISTER CONTROLLING A REVERSIBLE COUNTER

Heinz Haberle, Parksiedlung, Germany, assignor to International Standard Electric Corporation, New York, N.Y., a corporation of Delaware
Filed Nov. 2, 1966, Ser. No. 591,523
Claims priority, application Germany, Nov. 10, 1965, St 24,622
Int. Cl. H03k 5/20
U.S. Cl. 328—119 10 Claims This invention relates to pulse sequence detectors and more particularly to an arrangement to detect a sequence of $n$ pulses of the same binary type in a binary coded pulse train, for instance, a PCM (pulse code modulation) train.

It is known that some PCM systems employ a sync signal or combination having $n$ pulses or binary bits preferably of the same binary type, such as 1111. To synchronize the receiver of such systems, it is necessary to recognize or detect this sync combination. This may be accomplished by applying the received coded pulse train to a shift register which has a coincidence circuit coupled to the appropriate output (the "1" output) of each stage of the shift register which will produce an output when the sync combination is stored in the shift register. The output pulse from the sync detecting circuit can then be used for checking synchronization, for recognizing faults in the sync combination and, in the case of faults, for restoring synchronization as described in the German Patent 1,142,921.

Since the pulses of the sync combination can be interfered with on the transmission route, it is possible that a single sync combination can arrive erroneously at the receiver although the receiver is still synchronized. In such a case it would be wrong to initiate the searching process. In order to prevent this, two techniques can be employed.

(1) The process of searching is initiated only when the sync combination arrives erroneously three or more times in succession. Then the searching process is started, since it is very improbable that error in the sync combination will occur three or more times in succession by mere chance. In case of an actually wrong synchronization this delay is taken into consideration. The above-mentioned patent describes this type of trouble elimination.

(2) The recognition or detection of the sync combination in the receiver shift register is extended in such a way that the sync combination is evaluated as being provided not only when all sync bits arrive correctly, but it is also evaluated as being correct if one or more bits of the sync combination arrive wrong.

A single coincident circuit to recognize the sync combination is not sufficient for the second technique above described. In arrangements known to the art all correct bits are added at the output of the receiver shift register on a capacitor, or with the aid of an addition circuit, and it is then decided whether the total voltages is higher or lower than a predetermined threshold voltage. This will enable the determination of whether the sync combination is correct or in error. To provide such an arrangement the adding resistors are connected to appropriate terminals of the shift register which provides an output signal to a threshold circuit to enable evaluation of whether the sync combination is correct or in error.

This type of sync detection circuit has the following disadvantages:

(a) The analog decision at the threshold circuit is not without errors itself and, consequently, acts as a new source of errors, particularly in a system which is otherwise purely digital.

(b) After the decision is made it cannot be determined whether the sync combination was correct entirely or only partly.

(c) The circuit arrangement for such a decision results in considerable expenditure, particularly when the threshold value should be variable. A variable threshold value is required when the sensitivity of the recognizing circuit, depending on the instantaneous condition of the sync circuit, should be changed, that is sensitive when searching for synchronization and insensitive during synchronism.

An object of this invention is to provide an arrangement for detecting sync combinations whether the sync combinations are received correct or with one or several bits thereof in error.

Another object of this invention is to provide an arrangement to detect sync combination as set forth immediately above without the disadvantages mentioned hereinabove under (a), (b), and (c).

A feature of this invention is the provision of an arrangement to detect a sequence of $n$ pulses of the same binary type in a binary coded pulse train comprising a shift register having at least $n$ stages to which the coded pulse train is coupled, a reversible counter having $(n+1)$ stages, first means coupled to the first and last stages of the register and the counter to control the forward and reverse counting of the counter, and second means coupled to the last stage of the counter to provide an output signal indicating the detection of the sequence of $n$ pulses.

Another feature of this invention is the utilization of two timing pulse sequences for controlling the counter with the first timing sequence operating the counter in the forward direction during the first half of a pulse period depending on the contents of the first stage of the shift register while the second timing sequence controls the counter in the reverse direction during the second half of a pulse period depending on the contents of the $(n+1)$th stage of the shift register.

Still another feature of this invention is the utilization of inhibiting circuits appropriately coupled to the first and last stage of the shift register to prevent control of the counter if a pulse exists in the first and last stage of the shift register simultaneously.

The above mentioned and other features and objects of this invention will become more apparent by reference to the following description taken in conjunction with the accompanying drawings, in which.

Figure 1:
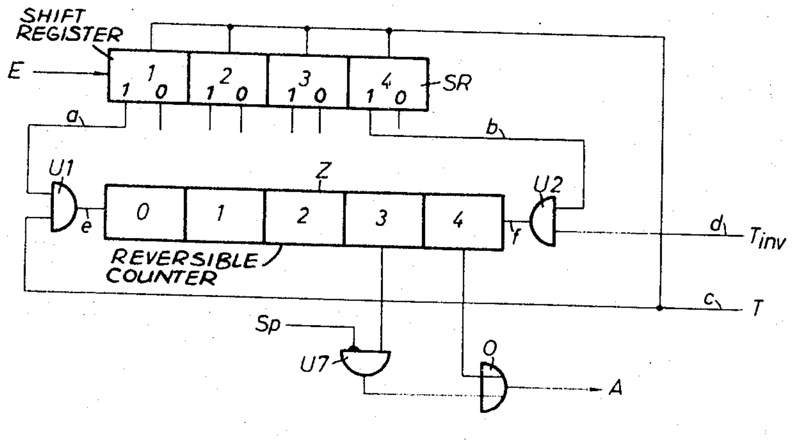
FIG. 1 is a block diagram of one embodiment of the detection circuit in accordance with the principles of this invention.
Figure 2:
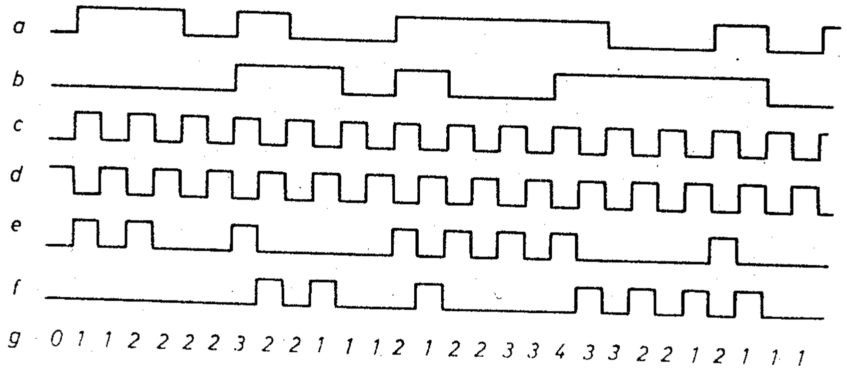
FIG. 2 illustrates waveforms that appear at the indicated points of the circuit of FIG. 1 illustrating the operation thereof.
Figure 3:
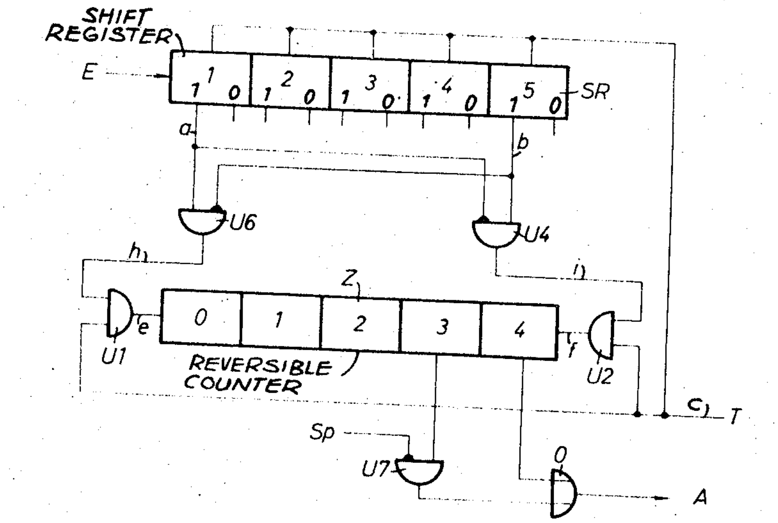
FIG. 3 is a block diagram of another embodiment of the detection circuit in accordance with the principles of this invention.
Figure 4:
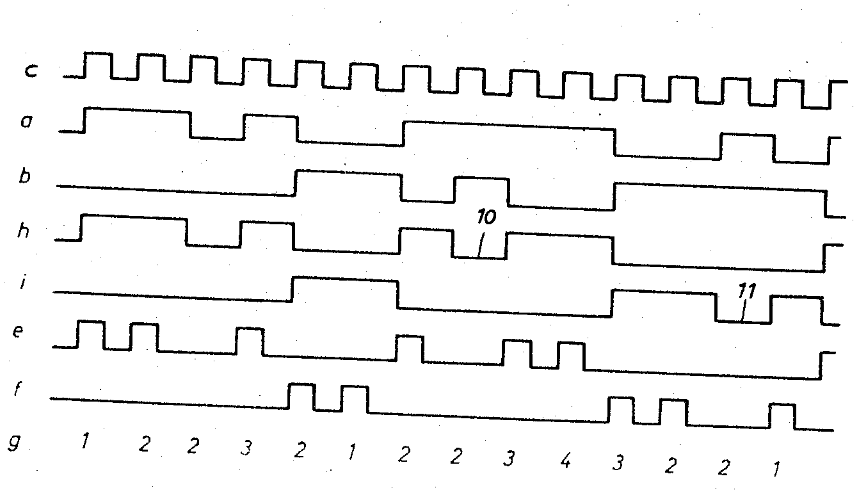
FIG. 4 shows the waveforms that appear at the indicated points of the circuit of FIG. 3 to illustrate the operation thereof.
Figure 5:
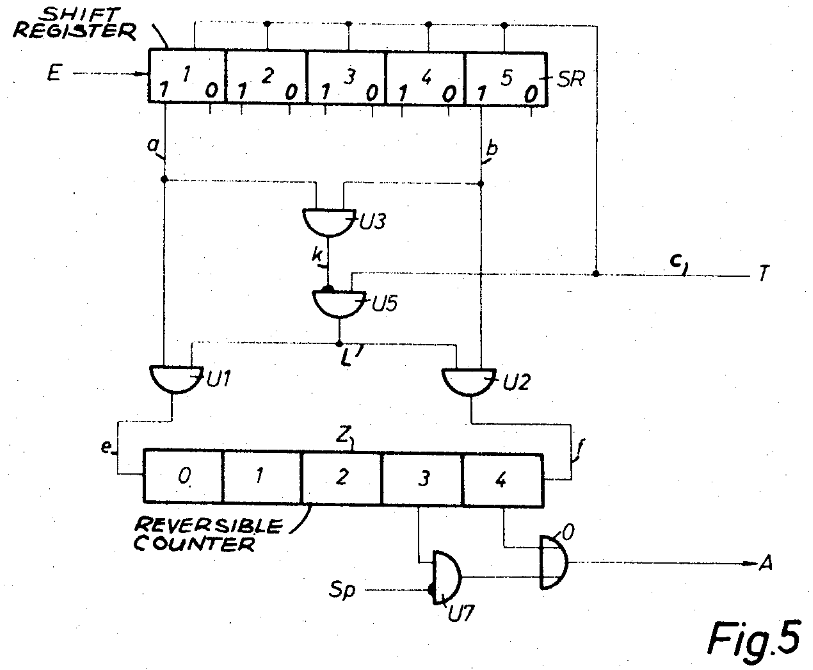
FIG. 5 is a block diagram of still another embodiment of the detection circuit in accordance with the principles of this invention.
Figure 6:
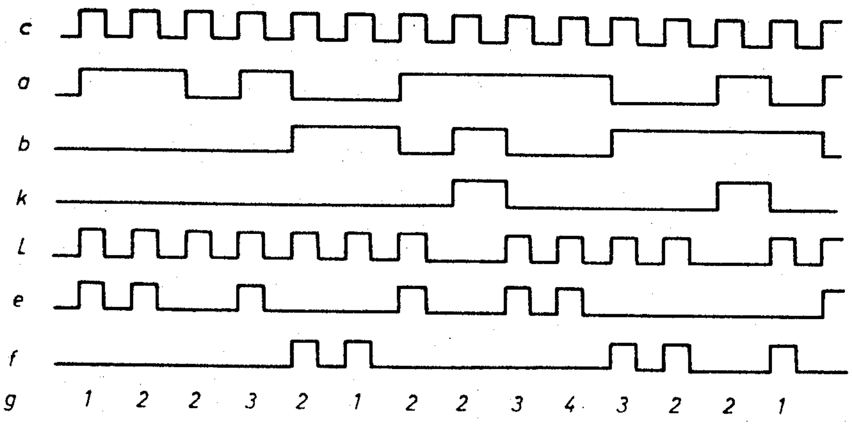
FIG. 6 shows waveforms appearing at the indicated points of the circuit of FIG. 5 illustrating the operation thereof.

Components of the FIGS. 1, 3 and 5 which are identical have applied thereto the same reference characters and the waveforms of FIGS. 2, 4 and 6 which appear at identical points in the circuits of FIGS. 1, 3 and 5 have the same reference characters applied thereto. For purposes of explanation, it will be assumed that $n=4$ and that the sync combination is 1111. An exact calculation of the synchronizing periods demonstrates that this combination is the most favorable with regard to the shortest possible synchronizing time.

Referring to FIG. 1, the coded pulse train is applied to shift register SR by the input E. The pulses are then shifted through the shift register by the timing signal *c* coupled to terminal T having the waveform illustrated in curve *c*, FIG. 2. The output signal of the first stage of shift register SR, as illustrated in curve *a*, FIG. 2, is applied to AND gate U1 which controls the passage of timing signal *c* to reversible counter Z. The output of AND gate U1 is illustrated in curve *e*, FIG. 2. It will be observed from this curve that a signal appears at the output of AND gate U1 only when a pulse appears at the "1" output of the first stage of shift register SR. The output signal of the fourth stage of shift register SR (the last stage), as illustrated in curve *b*, FIG. 2, is coupled to AND gate U2 to which is applied an inverted timing pulse *d*, as illustrated in curve *d*, FIG. 2. It will be noted that the timing pulses *c* and *d* are in a 180° phase relationship. AND gate U2 provides an output signal only when the last stage of the shift register has a "1" stored therein, as illustrated in curve *f*, FIG. 2. The two pulse trains *e* and *f* control the counting of counter Z in the forward and reverse direction, respectively.

The inverse timing pulse sequence *d* has been selected in this embodiment to prevent counter Z from being simultaneously advanced or reversed if a "1" should be stored simultaneously in both the first and last stage of shift register SR. In this arrangement, the correct counting position is obtained in the first half of a pulse period which means that the correct counting position is obtained at the earliest possible moment, as illustrated in curve *g*, FIG. 2. The fourth stage of counter Z provides an output signal A through means of OR gate 0 which indicates the detection of the sync combination and will be utilized in a known manner to maintain or restore synchronization.

As is obvious from the curves of FIG. 2 any other combination of coded pulses will prevent stage four of counter Z from having an output due to the reverse counting under control of waveform *f* except when the wanted sync combination is present in shift register SR at which time the last stage of counter Z will have an output therefrom.

To provide detection of the sync condition, even if one or more pulses of the sync combination are missing, INHIBIT gates can be coupled to the other stages of counter Z, such as indicated by U7 with respect to the third stage. Thus, the output of the third stage can be provided through the OR gate 0 if no inhibiting signal S*p* is applied to the INHIBIT gate U7. If no inhibiting signal is applied, the INHIBIT gate U7 will permit the passage of the output from the third stage through OR gate 0 thereby enabling a detection of an error in the individual pulses of the sync combination if any is present. As briefly mentioned hereinabove this type of INHIBIT gate can be coupled to the other stages of counter Z for evaluation of the content of these stages.

Counter Z advances by each "1" pulse entering shift register SR by one digit and reverses its count one digit by each "1" pulse leaving shift register SR. If the counter position was correct at the start of counting, it remains correct for all succeeding cases. However, if the counter position was wrong at the start of counting, it is corrected automatically as soon as the counter has counter the first time to the left or right stop. This is the situation if in the pulse train a sequence 1111 or 0000 has appeared. In a statistical pulse train this sequence appears, on the average, approximately after each $2^n$th shifting pulse.

Referring to FIG. 3, an embodiment of the sync combination detecting arrangement of this invention is illustrated in which counter Z does not require the two phase inverted timing pulse trains. In this embodiment shift register SR is larger by one stage. Pulses in the first stage control the passage of the timing signal *c* through AND gate U1 to control the forward counting of counter Z and pulses from the last stage of shift register SR control the passage of the timing pulse *c* through the AND gate U2 to control the reverse counting of counter Z. INHIBIT gate U4 is provided between the last stage of shift register SR and AND gate U2. INHIBIT gate U6 is provided between the first sage of shift register SR and AND gate U1. These INHIBIT gates prevent the passage of a pulse from the first or last stage of shift register SR when each of these stages has stored therein a "1," as illustrated at 10 on curve *h*, FIG. 4 and at 11 on curve *i*, FIG. 4. When the output from the first and last stage is inhibited by INHIBIT gates U4 and U6 there will be no counting control output from AND gates U1 or U2. The position of counter Z is evaluated as described hereinabove with respect to FIG. 1.

Referring to FIG. 5, another embodiment of the sync combination detecting circuit of this invention is illustrated which does not require the two timing signals in the 180° phase relationship as was required in the arrangement of FIG. 1. The first and last stages of shift register SR are coupled to AND gate U3. If a "1" is stored in both the first and last stages of shift register SR, AND gate U3 provides an output, as illustrated in curve *k*, FIG. 6 which blocks or inhibits INHIBIT gate U5 thereby preventing the timing pulses *c* from passing therethrough as illustrated in curve L, FIG. 6. Counter Z is controlled for forward and reverse counting by AND gates U1 and U2 when a "1" is applied from the stages of shift register SR to which they are connected provided these stages do not simultaneously have a "1" output.

The counter position indicates, in all three embodiments, the number of pulses coinciding with the desired sync combination stored in the shift register at any moment. If an output pulse is coupled from the fourth stage of counter Z, it means that the combination is correct only when this combination is received completely correct. If the signal is derived from stages 3 and 4 of counter Z through the use of INHIBIT gate U7 and OR gate 0, the combination is evaluated as being correct if one of the pulses is wrong. The sensitivity of the recognition circuit can be changed through INHIBIT gate U7 by applying the inhibit signal S*p* during the operation independent of the present condition of synchronization on a purely digital basis. By utilizing additional INHIBIT gates U7 coupled to the other stages of counter Z (not shown), it can be determined how many pulses are correct or in error at each synchronizing time.

In order to recognize the combination 1010, an inverter circuit (not shown) may be provided at the input of the shift register with this inverter changing the polarity of each second pulse of the arriving pulse train. It may happen that the combination 0000 arrives instead of the combination 1111. To prevent such a change in polarization of the entire pulse train means must be provided in the final stage to prevent this change in polarization, particularly for PCM, because in a cable the wires are frequently crossed, or interchanged, on the transmission route. A circuit arrangement changing the polarity of each second pulse is described in the German Auslegeschrift (DAS) 1,204,262. In this patent application the changing of polarity is recommended for PCM transmission because of transmission reasons. It may be used for the present invention without additional expenditure.

To recognize the combination 111 . . . 1000 . . . 0, the reversible counter can be divided into two separate counters where the first counter counts the number of "1" pulses and the second counter counts the number of "0" pulses. The toal of the correctly recognized pulses may be provided through simple coincidence circuits. Theoretically, this method can also be extended to several groups of "1" and "0" pulses. These cases, however, are of no interest for recognizing sync combinations, because a relatively arbitrary number of sync combinations can be selected and there is no reason to choose an irregular combination. As already mentioned hereinabove, the sync combination of all "1's" is the most favorable one with respect to obtaining the shortest possible synchronizing period.

While I have described above the principles of my invention in connection with specific apparatus, it is to be clearly understood that this description is made only by way of example and not as a limitation to the scope of my invention as set forth in the objects thereof and in the accompanying claims.

I claim:

1. An arrangement to detect a sequence of $n$ pulses of the same binary type in a binary coded pulse train comprising:
 a source of said coded pulse train;
 a shift register having at least $n$ stages coupled to said source;
 a reversible counter having $(n+1)$ stages;
 first means coupled to the first and last stages of said register and said counter to control the forward and reverse counting of said counter; and
 second means coupled to the last stage of said counter to provide a first output signal indicating the detection of said sequence of $n$ pulses.

2. An arrangement according to claim 1, further including
 third means coupled to at least one of the first to $n$th stages of said counter to selectively provide a second output signal therefrom.

3. An arrangement according to claim 1, wherein said first means includes
 third means to couple at least the first stage of said register to said counter to control the forward counting thereof, and
 fourth means to couple at least the last stage of said register to said counter to control the reverse counting thereof.

4. An arrangement according to claim 3, further including
 fifth means coupled to at least one of the first to $n$th stages of said counter to selectively provide a second output signal therefrom.

5. An arrangement according to claim 1, wherein said first means includes
 a first of timing pulses have a frequency equal to the frequency of said coded pulse train,
 a second source of timing pulses having a frequency equal to the frequency of said coded pulse train and a 180 degree relationship with respect to the timing pulses of said first source of timing pulses,
 a first AND gate having its inputs coupled to the first stage of said register and said first source of timing pulses and its output coupled to said counter to control the forward counting thereof, and
 a second AND gate having its inputs coupled to the last stage of said register and said second source of timing pulses and its output coupled to said counter to control the reverse counting thereof.

6. An arrangement according to claim 5, further including
 a source of control signal having a predetermined selecting characteristic, and
 an INHIBIT gate having its inhibiting input coupled to said source of control signal and its other input coupled to at least one of the first to $n$th stages of said counter to selectively provide a second output signal therefrom.

7. An arrangement according to claim 1, wherein said first means includes a source of timing pulses having a frequency equal to the frequency of said coded pulse train,
 a first INHIBIT gate having its inhibiting input coupled to the last stage of said register and its other input coupled to the first stage of said register,
 a second INHIBIT gate having its inhibiting input coupled to the first stage of said register and its other input coupled to the last stage of said register,
 a first AND gate having its inputs coupled to said source of timing pulses and the output of said first INHIBIT gate and its output coupled to said counter to control the forward counting thereof, and
 a second AND gate having its inputs coupled to said source of timing pulses and the output of said second INHIBIT gate and its output coupled to said counter to control the reverse counting thereof.

8. An arrangement according to claim 7, further including
 a source of control signal having a predetermined selecting characteristic, and
 a third INHIBIT gate having its inhibiting input coupled to said source of control signal and its other input coupled to at least one of the first $n$th stages of said counter to selectively provide a second output signal therefrom.

9. An arrangement according to claim 1, wherein said first means includes
 a source of timing pulses having a frequency equal to the frequency of said coded pulse train,
 a first AND gate having one input coupled to the first stage of said register and the other input coupled to the last stage of said register,
 a first INHIBIT gate having its inhibiting input coupled to the output of said first AND gate and its other input coupled to said source of timing pulses,
 a second AND gate having its inputs coupled to the output of said first INHIBIT gate and said first stage of said register and its output coupled to said counter to control the forward counting thereof, and
 a third AND gate having its inputs coupled to the output of said first INHIBIT gate and said last stage of said register and its output coupled to said counter to control the reverse counting thereof.

10. An arrangement according to claim 9, further including
 a source of control signal having a predetermined selecting characteristic, and
 a second INHIBIT gate having its inhibiting input coupled to said source of control signal and its other input coupled to at least one of the first to $n$th stages of said counter to selectively provide a second output signal therefrom.

References Cited

UNITED STATES PATENTS 3,147,342 9/1964 Chojnowski et al. ---- 178—23

ARTHUR GAUSS, *Primary Examiner.*

J. D. FREW, *Assistant Examiner.*

U.S. Cl. X.R.

328—37, 41, 44, 63, 72; 340—168